US012591771B2

(12) United States Patent (10) Patent No.: US 12,591,771 B2
Ardywibowo et al. (45) Date of Patent: Mar. 31, 2026

(54) DYNAMIC QUANTIZATION FOR ENERGY EFFICIENT DEEP LEARNING

(71) Applicant: QUALCOMM Incorporated, San Diego, CA (US)

(72) Inventors: Randy Ardywibowo, Bryan, TX (US); Venkata Ravi Kiran Dayana, San Diego, CA (US); Hau Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1040 days.

(21) Appl. No.: 17/488,261

(22) Filed: Sep. 28, 2021

(65) Prior Publication Data

US 2022/0101133 A1 Mar. 31, 2022

Related U.S. Application Data

(60) Provisional application No. 63/084,902, filed on Sep. 29, 2020.

(51) Int. Cl.
*G06N 3/08* (2023.01)
*G06F 18/21* (2023.01)
*G06N 3/048* (2023.01)

(52) U.S. Cl.
CPC ............. *G06N 3/08* (2013.01); *G06F 18/217* (2023.01); *G06N 3/048* (2023.01)

(58) Field of Classification Search
CPC .......... G06N 3/0495; G06N 3/04; G06N 3/08; G06N 3/048; G06F 18/217
See application file for complete search history.

(56) References Cited

U.S. PATENT DOCUMENTS

| 11,568,251 | B1 * | 1/2023 | Palkar | G06F 18/10 |
|---|---|---|---|---|
| 2018/0285736 | A1 * | 10/2018 | Baum | G06N 20/00 |
| 2019/0050710 | A1 | 2/2019 | Wang et al. | |
| 2019/0171927 | A1 * | 6/2019 | Diril | G06N 3/08 |
| 2020/0097818 | A1 * | 3/2020 | Li | G06N 3/08 |
| 2020/0134461 | A1 * | 4/2020 | Chai | G06N 3/084 |
| 2020/0293895 | A1 * | 9/2020 | Tachibana | G06N 3/045 |

(Continued)

FOREIGN PATENT DOCUMENTS

| CN | 110163240 A | 8/2019 |
|---|---|---|
| CN | 110222821 A | 9/2019 |

(Continued)

OTHER PUBLICATIONS

Xu, Yuhui, et al. "DNQ: Dynamic network quantization." arXiv preprint arXiv:1812.02375 (2018). (Year: 2018).*

(Continued)

*Primary Examiner* — Andrew T Chiusano
(74) *Attorney, Agent, or Firm* — Seyfarth Shaw LLP

(57) ABSTRACT

A method performed by a deep neural network (DNN) includes receiving, at a layer of the DNN during an inference stage, a layer input comprising content associated with a DNN input received at the DNN. The method also includes quantizing one or more parameters of a plurality of parameters associated with the layer based on the content of the layer input. The method further includes performing a task corresponding to the DNN input, the task performed with the one or more one quantized parameters.

28 Claims, 7 Drawing Sheets

(56) References Cited

U.S. PATENT DOCUMENTS

| | | | | |
|---|---|---|---|---|
| 2020/0302271 | A1 | 9/2020 | Ovtcharov et al. | |
| 2021/0089925 | A1* | 3/2021 | Partovi Nia | G06N 3/048 |
| 2021/0279635 | A1* | 9/2021 | Gadelrab | G06N 5/04 |
| 2022/0284260 | A1* | 9/2022 | Patel | G06N 3/0495 |

FOREIGN PATENT DOCUMENTS

| | | | |
|---|---|---|---|
| CN | 110969251 | A | 4/2020 |
| CN | 111008701 | A | 4/2020 |
| EP | 3543917 | A1 | 9/2019 |
| WO | 2020190543 | A1 | 9/2020 |
| WO | 2021057085 | A1 | 4/2021 |

OTHER PUBLICATIONS

Song, Zhuoran, et al. "Drq: dynamic region-based quantization for deep neural network acceleration." 2020 ACM/IEEE 47th Annual International Symposium on Computer Architecture (ISCA). IEEE, 2020. (Year: 2020).*

Gholami, Amir, et al. "A survey of quantization methods for efficient neural network inference." Low-power computer vision. Chapman and Hall/CRC, 2022. 291-326. (Year: 2022).*

Krishnamoorthi, Raghuraman. "Quantizing deep convolutional networks for efficient inference: A whitepaper." arXiv preprint arXiv:1806. 08342 (2018). (Year: 2018).*

International Search Report and Written Opinion—PCT/US2021/052721—ISA/EPO—Feb. 2, 2022.

Jin Q., et al., "AdaBits: Neural Network Quantization With Adaptive Bit-Widths", 2020 IEEE/CVF Conference on Computer Vision and Pattern Recognition (CVPR), IEEE, Jun. 13, 2020 (Jun. 13, 2020), pp. 2143-2153, XP033803607, DOI: 10.1109/CVPR42600.

2020.00222 [retrieved on Aug. 3, 2020], abstract, figure 1, Sections 1,2,4, and 5.

Martinez B., et al., "Training Binary Neural Networks with Real-to-Binary Convolutions", ArXiv, Mar. 25, 2020 (Mar. 25, 2020), pp. 1-11, XP055882313, Retrieved from the Internet: URL: https://arxiv.org/pdf/2003.11535.pdf [retrieved on Jan. 21, 2022] abstract, figure 1, Sections 1-4.3, 5.1.

Uhlich S., et al., "Mixed Precision DNNs: All You Need is a Good Parametrization", arxiv.org, Cornell University Library, 201 Olin Library Cornell University Ithaca, NY, 14853, May 27, 2019 (May 27, 2019), 21 Pages, XP081663581, abstract, table 4, Sections 1-2, 5.

Zhang D., et al., "LQ-Nets: Learned Quantization for Highly Accurate and Compact Deep Neural Networks (Supplementary Material)", arxiv.org, Cornell University Library, 201 Olin Library Cornell University Ithaca, NY, 14853, Jul. 26, 2018 (Jul. 26, 2018), 21 Pages, XP081254053, abstract, figure 2, Sections 1-3, and 5, Algorithm 1.

Zhu X., et al., "Adaptive Layerwise Quantization for Deep Neural Network Compression", 2018 IEEE International Conference on Multimedia and Expo (ICME), IEEE, Jul. 23, 2018 (Jul. 23, 2018), pp. 1-6, XP033417577, DOI: 10.1109/ICME.2018.8486500 [retrieved on Oct. 8, 2018] abstract, Sections 1-2, 3.1-3.4, and 4.

Jin Q., et al., "AdaBits: Neural Network Quantization With Adaptive Bit-Widths", arXiv:1912.09666v1 [cs.CV], Dec. 20, 2019, 10 Pages.

Shawahna A., et al., "FPGA-Based Accelerators of Deep Learning Networks for Learning and Classification: A Review", IEEE Access, vol. 7, 2019, Dec. 28, 2018, pp. 7823-7859.

Zhu X., et al., "Adaptive Layerwise Quantization for Deep Neural Network Compression", IEEE, 2018 IEEE International Conference on Multimedia and Expo (ICME), Jul. 27, 2020, 6 Pages.

* cited by examiner

100

102 — CPU

104 — GPU

106 — DSP

108 — NPU

110 — CONNECTIVITY

112 — MULTIMEDIA

114 — SENSORS

116 — ISPs

118 — MEMORY

120 — NAVIGATION

202

FULLY CONNECTED

204

LOCALLY CONNECTED

210

212

214

216

206

CONVOLUTIONAL

208

350

INPUT DATA — 352

354A

CONV — 356

LNorm — 358

MAX POOL — 360

354B

CONV — 356

LNorm — 358

MAX POOL — 360

FC1 — 362

FC2 — 362

LR — 364

CLASSIFICATION SCORE — 366

600

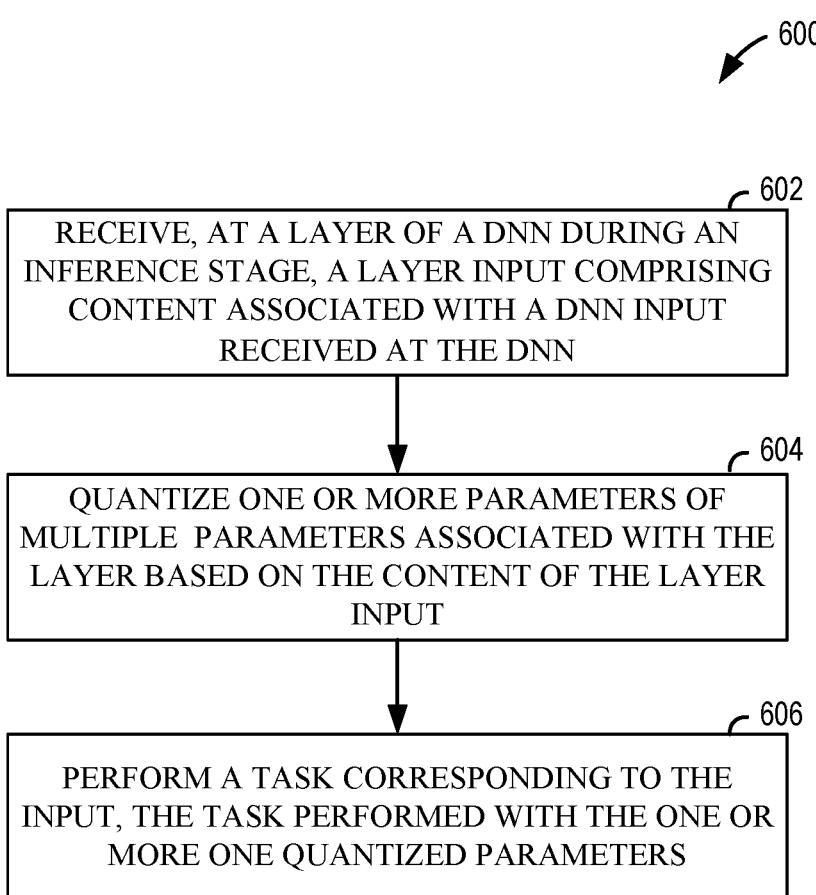

602

RECEIVE, AT A LAYER OF A DNN DURING AN INFERENCE STAGE, A LAYER INPUT COMPRISING CONTENT ASSOCIATED WITH A DNN INPUT RECEIVED AT THE DNN

604

QUANTIZE ONE OR MORE PARAMETERS OF MULTIPLE PARAMETERS ASSOCIATED WITH THE LAYER BASED ON THE CONTENT OF THE LAYER INPUT

606

PERFORM A TASK CORRESPONDING TO THE INPUT, THE TASK PERFORMED WITH THE ONE OR MORE ONE QUANTIZED PARAMETERS

*FIG. 6*

DYNAMIC QUANTIZATION FOR ENERGY EFFICIENT DEEP LEARNING

CROSS-REFERENCE TO RELATED APPLICATION

The present application claims the benefit of U.S. Provisional Patent Application No. 63/084,902, filed on Sep. 29, 2020, and titled "DYNAMIC QUANTIZATION FOR ENERGY EFFICIENT DEEP LEARNING," the disclosure of which is expressly incorporated by reference in its entirety.

BACKGROUND

Field

Aspects of the present disclosure generally relate to dynamic quantization for energy efficient deep learning neural networks.

Background

Convolutional neural networks, such as deep convolutional neural networks (DCNNs), may use a large amount of computational and storage resources. As such, it may be difficult to deploy conventional neural networks on systems with limited resources, such as cloud systems, embedded systems, or federated learning systems. Some conventional neural networks are pruned and/or quantized to reduce processor load and/or memory use. It is desirable to improve quantization methods to reduce computational and storage resources.

SUMMARY

In one aspect of the present disclosure, a method performed by a deep neural network (DNN) is disclosed. The method includes receiving, at a layer of the DNN during an inference stage, a layer input comprising content associated with a DNN input received at the DNN. The method also includes quantizing one or more parameters of a plurality of parameters associated with the layer based on the content of the layer input. The method further includes performing a task corresponding to the DNN input, the task performed with the one or more one quantized parameters.

Another aspect of the present disclosure is directed to an apparatus including means for receiving, at a layer of the DNN during an inference stage, a layer input comprising content associated with a DNN input received at the DNN. The apparatus also includes means for quantizing one or more parameters of a plurality of parameters associated with the layer based on the content of the layer input. The apparatus further includes means for performing a task corresponding to the DNN input, the task performed with the one or more one quantized parameters.

In another aspect of the present disclosure, a non-transitory computer-readable medium with non-transitory program code recorded thereon is disclosed. The program code is for a DNN. The program code is executed by a processor and includes program code to receiving, at a layer of the DNN during an inference stage, a layer input comprising content associated with a DNN input received at the DNN. The program code also includes program code to quantize one or more parameters of a plurality of parameters associated with the layer based on the content of the layer input. The program code further includes program code to perform a task corresponding to the DNN input, the task performed with the one or more one quantized parameters.

Another aspect of the present disclosure is directed to an apparatus. The apparatus having a memory, one or more processors coupled to the memory, and instructions stored in the memory. The instructions being operable, when executed by the processor, to cause the apparatus to receive, at a layer of a DNN during an inference stage, a layer input comprising content associated with a DNN input received at the DNN. The instructions also cause the apparatus to quantize one or more parameters of a plurality of parameters associated with the layer based on the content of the layer input. The instructions additionally cause the apparatus to perform a task corresponding to the DNN input, the task performed with the one or more one quantized parameters.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 6 a flow diagram illustrating an example process performed, for example, by a trained deep neural network, in accordance with various aspects of the present disclosure.

DETAILED DESCRIPTION

Figure 1:
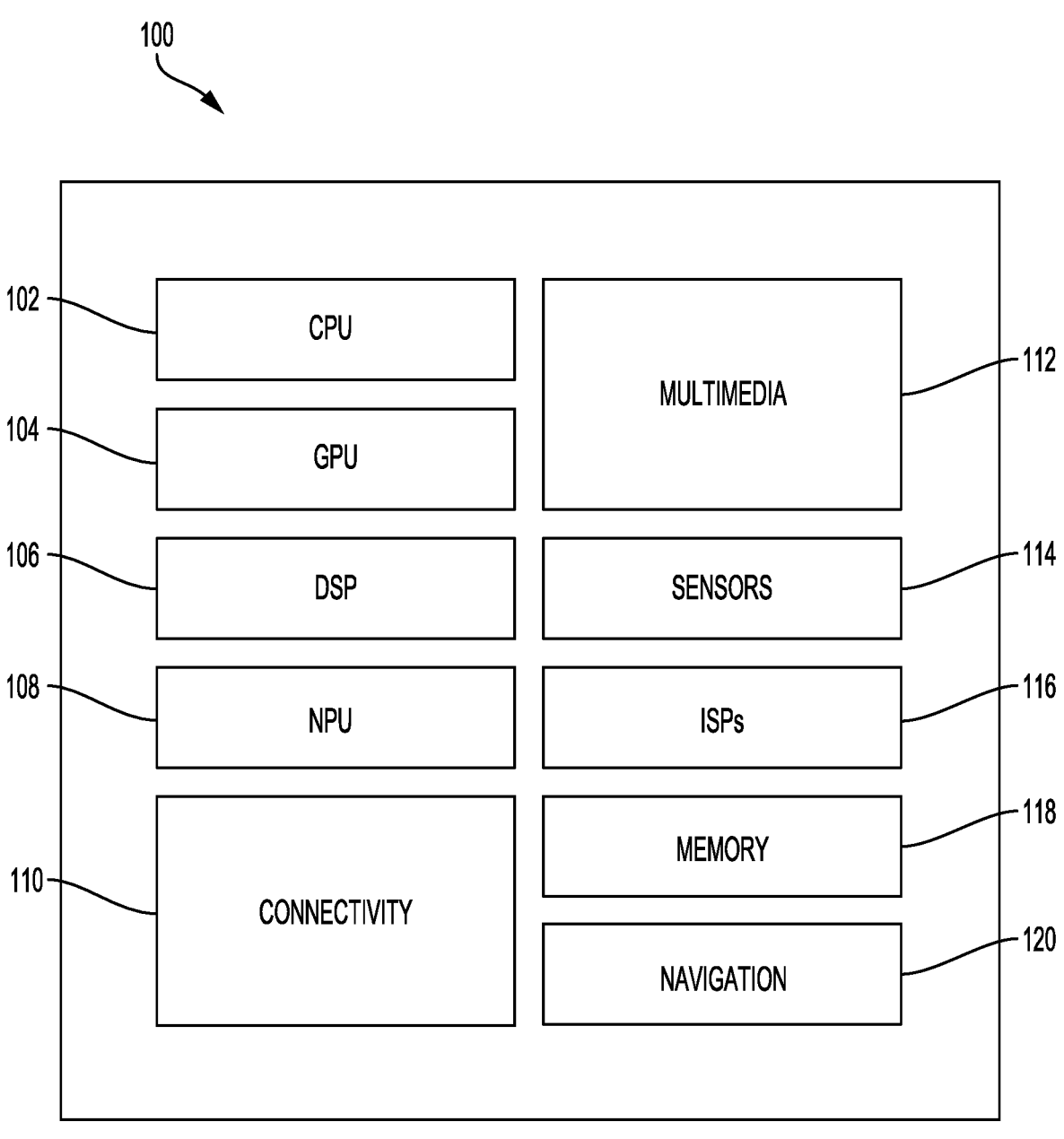
FIG. 1 illustrates an example implementation of designing a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described and may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described and many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Deep convolutional neural networks (DCNNs) may be specified for various tasks, such as, for example, computer vision, speech recognition, and natural language processing. Conventional DCNNs may include a large number of weights and parameters, and may be compute-intensive. Therefore, deployment of DCNNs may be difficult on embedded devices with limited resources, such as limited computational power and/or limited memory capacity. A DCNN may also be referred to as deep neural network (DNNs) or a deep convolutional network (DCN). The DCNN may include three or more total layers, where one layer is a hidden layer.

Due to the compute-intensive nature of DNNs, it may be desirable to dynamically reduce the model size and computational cost at run-time. Conventional systems reduce the model size and computation complexity by applying separable filters, pruning weights, and/or reducing a bit-width.

Additionally, conventional systems may reduce the model size and computation complexity during training. These conventional systems do not dynamically reduce the model size and computational cost during testing (e.g., run-time) based on content, such as features, of an input.

In some examples, a bit-width may be reduced to reduce the model size and computational cost. Bit-width reduction includes a quantization process that maps continuous real values to discrete integers. Still, reducing a bit-width may increase quantization error, thereby decreasing the accuracy of the DNN. As such, there is a trade-off between model accuracy and model efficiency. To optimize the trade-off between model accuracy and model efficiency, conventional systems train (e.g., tailor) models to optimize accuracy based on a resource budget. That is, different models may be trained according to different resource budgets. Training different models according to different resource budgets may prevent dynamic bit-width adjustment.

Some conventional systems train a single model that is flexible and scalable. For example, a number of channels may be adjusted by changing a width-multiplier in each layer. As another example, a depth, width, and kernel size may be dynamically adjusted. Still, these conventional systems do not dynamically adjust a weight bit-width and/or an activation bit-width.

Aspects of the present disclosure are directed to a dynamic quantization method that dynamically selects a quantization level of each layer of a trained model to optimize a trade-off between reducing a number of used resources (e.g., processor, battery, and/or memory resources) and inference accuracy. In such aspects, the dynamic quantization method may be performed during testing (e.g., run-time) of the trained model.

FIG. 1 illustrates an example implementation of a system-on-a-chip (SOC) 100, which may include a central processing unit (CPU) 102 or a multi-core CPU configured for dynamic bit-width quantization in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to identify content of an input received at the DNN; quantize one or more parameters of a number of parameters of a layer of the DNN based on the content of the input; and perform a task corresponding to the input. The task may be performed with the quantized parameter.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
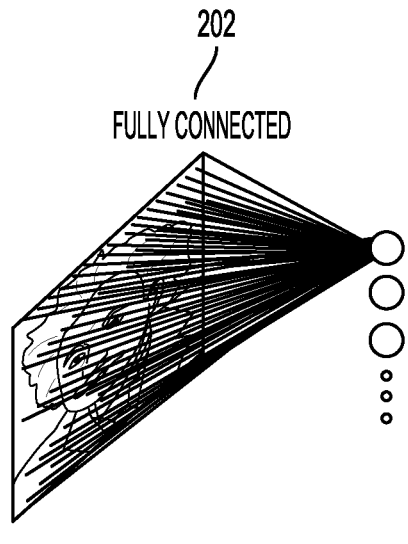
FIGS. 2A, 2B, and 2C are diagrams illustrating a neural network, in accordance with aspects of the present disclosure.
Figure 2B:
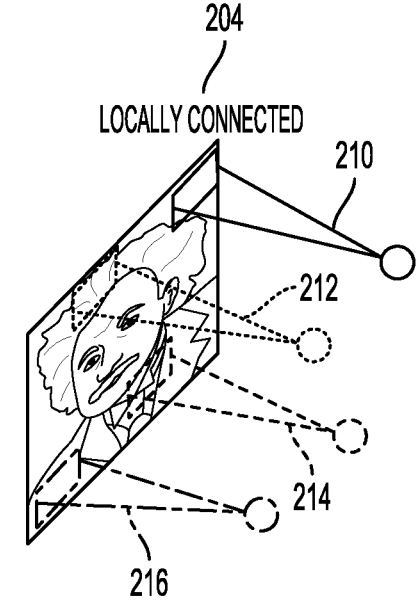

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
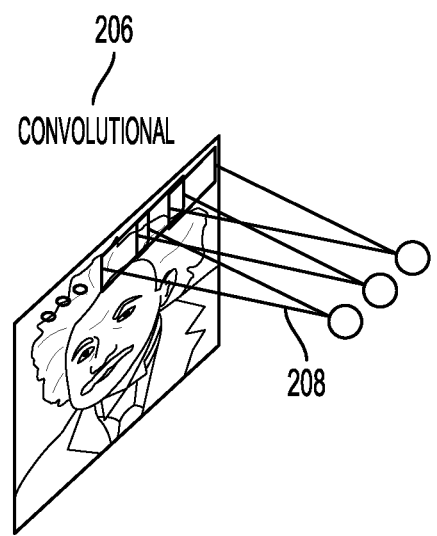

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
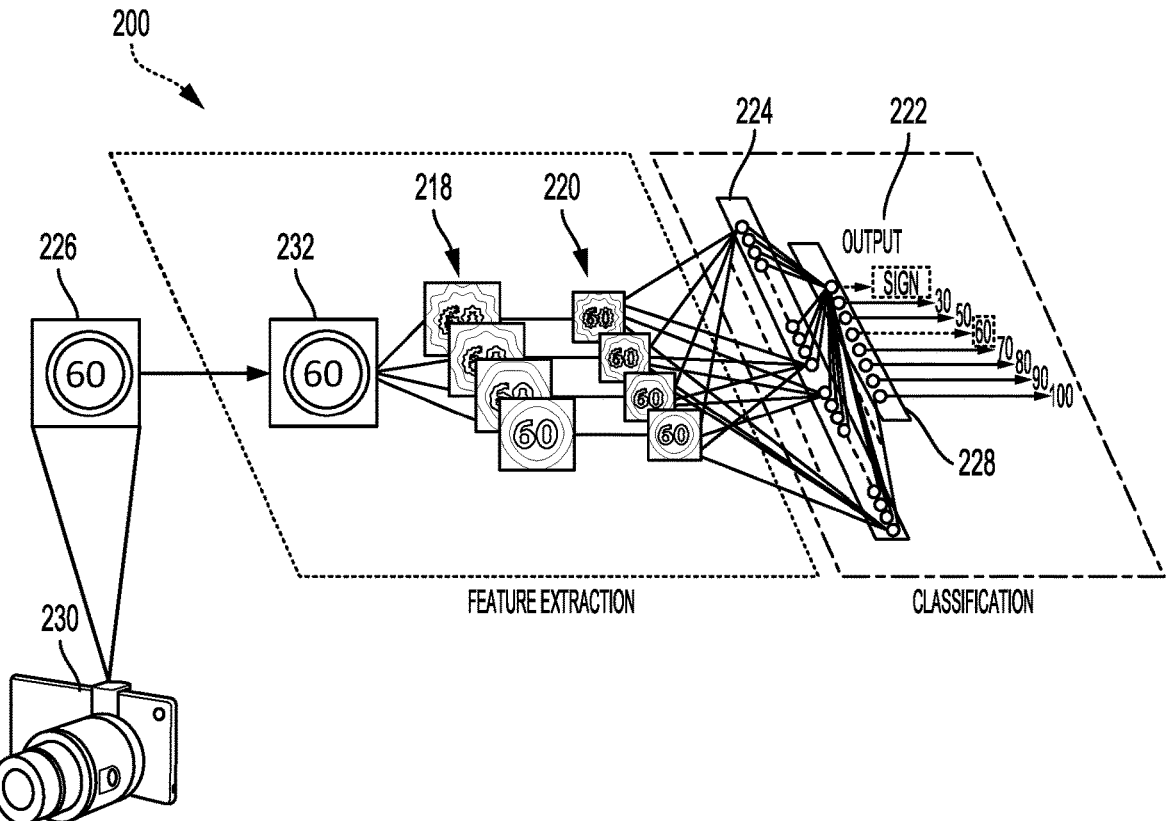
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown)

may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, $\max(0, x)$. Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
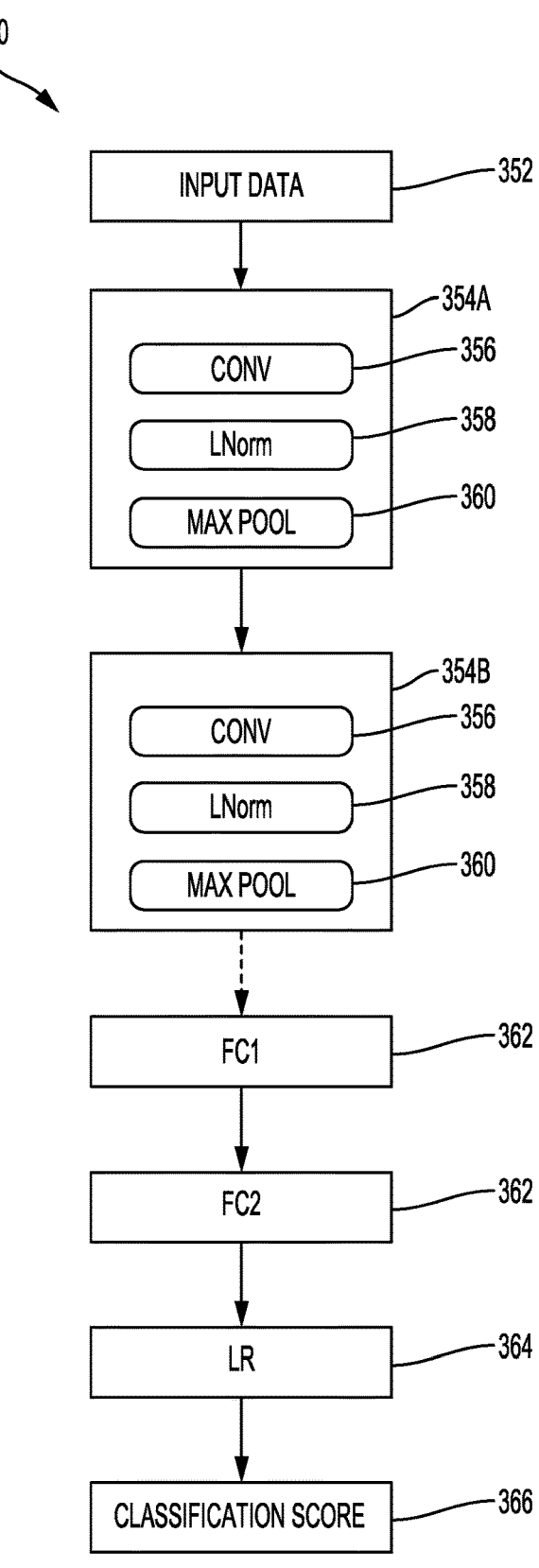
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data, including a feature from a set of features.

As discussed, deep neural networks (DNNs) may be compute-intensive. As such, DNNs may increase the use of system resources, such as processor load and/or memory use. Quantization may reduce a number of computations, such as binary computations, by reducing weight and/or parameter bit-widths. As a result, quantization may reduce an amount of system resources used by a DNN, thereby improving system performance.

Conventional quantization methods are static. For example, conventional quantization methods do not adapt to an input to the DNN. Additionally, or alternatively, conventional quantization methods do not adapt to the energy level of a device executing the DNN. Aspects of the present disclosure are directed to a dynamic quantization method that adaptively selects quantization levels based on content, such as features, of an input. As discussed, in some implementations, bits of one or more layers of a neural network (e.g., a deep neural network (DNN)) may be quantized at an inference stage (e.g., testing stage).

Aspects of the present disclosure propose a dynamic quantization method that adaptively varies the quantization precision (e.g., bit-depth) based on an input or content of the input, such as features extracted at each layer of the DNN. In one configuration, the bit-depth is learned based on L0 regularized learning that penalizes large bit-depths (see Equation 6).

The quantization may be a layer-wise quantization or a layer-wise and channel-wise quantization. In one configuration, a module (e.g., computation/circuitry) examines the input (e.g., content of the input) for a neural network layer(s). The output of the module determines an amount of quantization of the activations and/or weights of a neural network layer(s). In some examples, each layer output may be considered a feature. In some configurations, a separate module may be specified for each layer to determine the amount of quantization for that specific layer.

Accordingly, the quantization of activations and weights may vary based on the input. That is, with different inputs to the neural network, the quantization of the activations and/or weights used by the layer(s) of the neural network may vary. Different examples of inputs may select different quantization bit-depths for activations and/or weights to produce a statistically noticeable delta in bit-level compute complexity. Examples of different inputs include inputs for classifying different classes, such as classifying cats and dogs, or different inputs for image processing, such as image restoration, where the inputs may be low light images and normal light images. In some examples, inputs may be distinguished based on an background, such as a background of an image. In such examples, some inputs may be categorized as a simple background input and other inputs may be categorized as a complex background input. Different bits may be selected for the simple background inputs and complex background inputs. In some examples, operators that use higher bit-depths may take longer than those that use a lower number of bits. For example, an 8-bit multiply and accumulate operations may be composed for 4-bit multiply and accumulate operations, such that an 8-bit version of a convolution may take longer than one that uses 4 bits or less.

In one configuration, a gating mechanism may be specified to reduce/discard bits, starting from the least significant bit, of the activation bits before this is fed into a neural network processing layer(s) (e.g., activations that may be input to a convolutional layer). Another gating mechanism may be specified to reduce/discard bits, starting from the least significant bit, bits before the remaining bits are used by a neural network processing layer(s) (e.g., weights/bias used by a convolutional layer).

In one configuration, in order to take advantage of per-input bit-level compute complexity, inference hardware may be modified to support a dynamic configuration of bit-depths at layer and/or channel granularity. Inference hardware may take advantage of dynamic bit-depth selection to improve power use and/or latency. As an example, inference hardware may use a lower bit-depth to reduce power consumption and or to reduce latency.

Figure 4A:
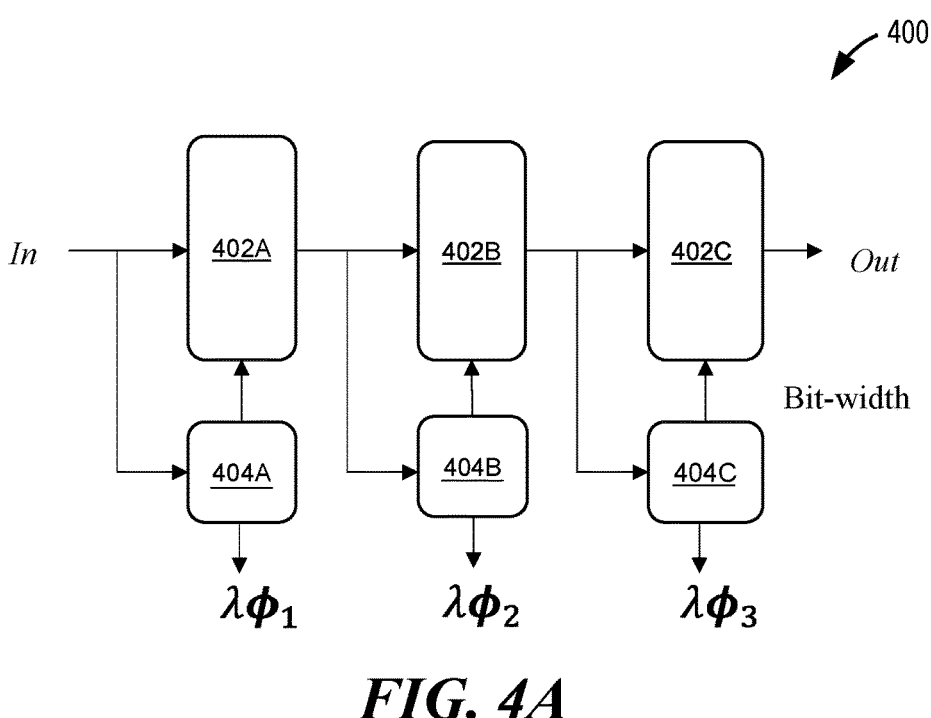
FIG. 4A is a block diagram illustrating an example of a neural network model, in accordance with aspects of the present disclosure.

In some aspects, a bit-width selector layer may be associated with each layer of a neural network model (e.g., DNN). The bit-width selector may be trained to minimize a classification loss (L) while also reducing a per-layer bit-width. FIG. 4A is a diagram illustrating an example of a neural network model 400, in accordance with aspects of the present disclosure. The neural network model 400 may be an example of a DNN. In the example of FIG. 4A, the neural network model 400 may dynamically adjust a per-layer bit-width based on an input (shown as In), such as content of the input. In some examples, the content may be features of an input, where the features may be extracted at one or more layers 402A, 402B, 402C of the neural network model 400. The layers 402A, 402B, 402C of the neural network model 400 are provided for exemplary purposes. The neural network model 400 is not limited to three layers 402A, 402B, 402C as shown in FIG. 4A, additional, or fewer, layers may be used in neural network model 400. In the example of FIG. 4A each layer 402A, 402B, 402C may be an example of one of a convolutional layer 232, 356, a normalization layer 358, a max pooling layer 360, a fully connected layer 362, or a logistic regression layer 364 described with reference to FIGS. 2 and 3.

In the example of FIG. 4A, each layer 402A, 402B, 402C may be associated with a bit-width selector 404A, 404B, 404C. Each bit-width selector 404A, 404B, 404C may be data-dependent and may be a layer of the neural network model 400. Additionally, each bit-width selector 404A, 404B, 404C may also implement a bit-width selection function ($\sigma_i$) for selecting a quantization depth for a corresponding layer 402A, 402B, 402C. For example, as shown in FIG. 4A, a first layer 402A and a first bit-width selector 404A may receive the input (In). Based on the input (e.g., the content of the input), the first bit-width selector 404A may select a bit width ($\phi_1$) for the first layer 402A. In the current example, the first layer 402A may process the input and generate an output that is received at a second layer 402B and a second bit-width selector 404B. In this example, the second bit-width selector 404B selects a bit width ($\phi_2$) for the second layer 402B based on the output of the first layer 402A. The process continues for a third layer 402C, such that a third bit-width selector 404C selects a bit width ($\phi_3$) for the third layer 402C based on the output of the second layer 402B.

According to aspects of the present disclosure, a bit-width $\phi_i$ for each layer may be selected based on the training. The regularization term $\lambda$ may be specified during training and is may be omitted during inference. In the example of FIG. 4A, the output ($\lambda\phi_i$) corresponding to the downward arrow from each bit-width selector 404A, 404B, 404C may be generated during training and may be omitted during inference. The regularization term $\lambda$ may be set by the user and may be device or task specific. The bit-width $\phi_i$ may also be referred to as the bit-depth. In the example of FIG. 4A, the upward arrow from each bit-width selector 404A, 404B, 404C may correspond to a bit-width $\phi_i$ for a corresponding layer. As discussed, the bit-width selection function ($\sigma_i$) implemented at each bit-width selector 404A, 404B, 404C may be trained to penalize large bit widths and/or one or more associated complexity metrics while optimizing performance while optimizing performance. During training and inference, the output of each bit-width selector 404A, 404B, 404C may be similar to the output described with reference to FIG. 4B or 5.

Figure 4B:
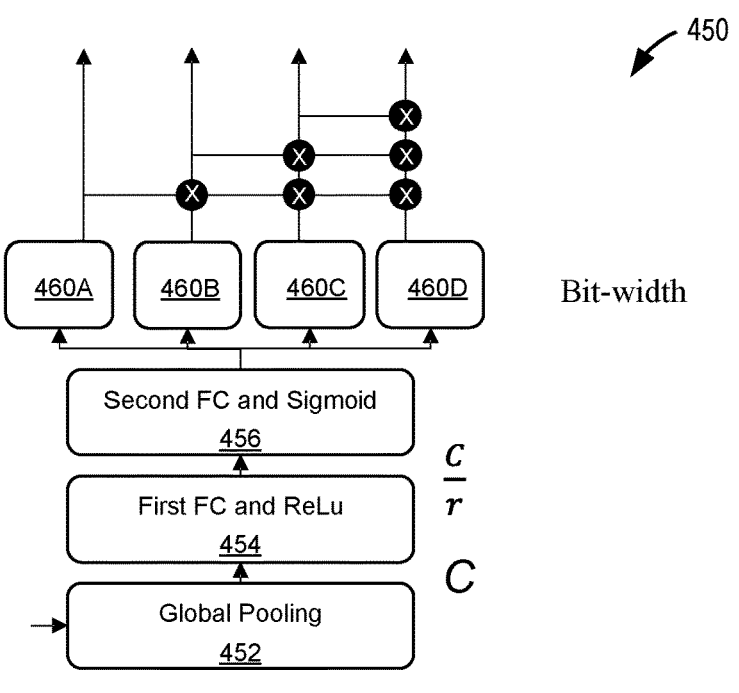
FIG. 4B is a block diagram illustrating an example of a bit-width selector, in accordance with aspects of the present disclosure.

FIG. 4B is a block diagram illustrating an example of a data-dependent bit-width selector 450, in accordance with aspects of the present disclosure. In the example of FIG. 4B, the bit-width selector 450 may be an example of each of the bit-width selectors 404A, 404B, 404C described in FIG. 4A. As shown in FIG. 4B, the bit-width selector 450 includes a global pooling layer 452, a first fully connected (FC) layer 454 that implements a rectified linear unit (ReLu) activation function, and a second fully connected layer 456 that implements a sigmoid function.

In the example of FIG. 4B, an input to the bit-width selector 450 may be received at the global pooling layer 452 and collapsed to a 1×1×C vector, where the parameter C represents a number of channels of a layer corresponding to the bit-width selector 450. The first fully connected layer 454 receives the 1×1×C vector to generate an output having a dimension C/r, where C/r corresponds to a number of gates 460A, 460B, 460C, 460D, and the parameter r is the reduction factor which is a integer divisor of C. In one configuration, r is a hyperparameter. The output of the first fully connected layer 454 is received at the second fully connected layer 456. The output of the second fully connected layer 456 is received at a number of gates ($g^i$) 460A, 460B, 460C, 460D specified for the bit-width selector 450. In the example of FIG. 4B, the output of the second fully connected layer 456 is received at a first gate 460A ($g^3$), a second gate 460B ($g^2$), a third gate 460C ($g^1$), and a fourth gate 460D ($g^0$).

In the example of FIG. 4B, the global pooling layer 452 (e.g., global average pooling layer) may combine the information of the input activation/features and generate statistics, such as an average value, per channel. A global descriptor of the input features may be generated based on the channel-wise statistics. The statistics generated at the global pooling layer 452 may be combined using the first fully connected layer 454 with ReLu or other non-linear activations. The second fully connected layer 456 may implement a sigmoid activation providing a range of zero to one. A bit expansion layer (not shown in FIG. 4B) generates output bit-width selector gates 460A, 460B, 460C, 460D by multiplying the sigmoid output of the second fully connected layer 456 with learned weights of a bit-width dimension. For example, the bit-expansion layer may have eight weights to determine a bit-width for an 8-bit network.

In one configuration, lesser significant bits are only selected if the higher significant bits are selected. In the example above, the maximum bit-width for a layer associated with the data-dependent bit-width selector 450 may be based on a number of gates ($g^i$) 460A, 460B, 460C, 460D specified for the data-dependent bit-width selector 450. In this example, lesser significant bits, such as bits associated with a second gate 460B ($g^2$), a third gate 460C ($g^1$), and a fourth gate 460D ($g^0$), may be selected if a higher significant bit, such as a bit associated with a first gate 460A ($g^3$), is selected. In one configuration, the gates 460A, 460B, 460C, 460D are linear or based on a power of two.

In the example of FIG. 4B, the architecture of the bit-width selector 450 is exemplary. The neural network model of the present disclosure is not limited to the global pooling layer 452, first fully connected layer 454, and second fully connected layer 456 shown in FIG. 4B. Other layer configurations are contemplated.

During training, each layer of a neural network model, such as the layers 402A, 402B, 402C described with reference to FIG. 4A, incurs a loss $L_q^i$ that penalizes a large bit-width during inference. The loss $L_q^i$ may be a sparse regularization $L_0$. Each layer may also incur a performance loss $L_p$ for a specified task, such as a prediction or regression accuracy. Aspects of the present disclosure are not limited to the described network configurations. Other network configurations are contemplated. In some examples, the regularization loss $L_0$ may penalize bit-level operations (BOPs). The BOP may be a product of a selected bit-width and a layer complexity. The loss function may be defined as:

$$\min_{\theta, z} \frac{1}{N}\left(\left(\sum_{i=1}^{N} \mathcal{L}(f(x_i \cdot z_i^a; \theta \cdot z_i^w), y_i)\right) + \lambda\|z_i\|_{bit}\right), \quad (1)$$

where the parameter $\mathcal{L}$ represents a loss, parameter $x_i$ is an input, parameter $z_i^a$ is an activation bit-width, the parameter $\theta$ represents a parameter of the model, such as the neural network model 400 of FIG. 4, parameter $z_i^w$ is a weight bit-width, parameter $y_i$ is a label, parameter $\|z_i\|_{bit}$ is bitwise regularization $L_0$, and the parameter $\lambda$ represents a weighting factor for regularization. In Equation 1, N represents a total number of training examples. A first term of Equation 1 ($\mathcal{L}(f(x_i \cdot z_a; \theta \cdot z_{wi}), y_i)$) a model training loss between a prediction f( ) and a label $y_i$. A second term ($\lambda\|z_i\|_{bit}$) is a per training sample bit-width count/penalty.

The regularization loss $L_0$ is discrete, therefore, the regularization loss $L_0$ is not differentiable. The bit-width z may be represented as discrete sampling from a Bernoulli distribution. In one configuration, $z\sim\pi=$Bernoulli($\phi$), where the parameter $\phi$ represents a number of bits selected for a layer, such that the total loss (e.g., regularization loss $L_0$ and performance loss $\mathcal{L}$) may be written as:

$$\min_{\theta, z} E_{(x_i, y_i)\sim D}\left[\mathbb{E}_{z\sim\pi}\left[\frac{1}{N}\left(\sum_{i=1}^{N} \mathcal{L}(f(x_i \cdot z_a; \theta \cdot z_w), y_i)\right) + \lambda\|z_i\|_{bit}\right]\right]. \quad (2)$$

Equation 2 cannot be differentiable and may be discretely sampled. In some implementations, the original problem may be recovered by restricting a number of bits for each layer to zero and one (e.g., $\phi\in\{0,1\}$). The original problem may be recovered to solve for dynamic quantization by selecting quantization bits. The original problem may be reformulated to make it solvable. The reformulated regularization terms may be optimized using minibatch gradient descent. Additionally, the reformulated regularization term may be analytically evaluated. Equation 3 is a reformulation of regularization term. Additionally, Equation 3 may be differentiable:

$$\mathbb{E}_{z\sim\pi}[\|z\|_0] = \mathbb{E}_{z\sim Bernoulli(\phi)}[\|z\|_0] = \sum\nolimits_{j=1}^{P}\phi_j \qquad (3)$$

As described, the bit-depth z is not differentiable. The bit-depth z may be relaxed by applying a sigmoid function. A binary random variable may be sampled as follows:

$$L = \log u - \log(1-u). \qquad (4)$$

Based on Equation 4, the bit-depth z may be one if (log $\phi$+L)>0 and the bit-depth z may be zero if (log $\phi$+L)<0. The discontinuous function may be replaced with a sigmoid:

$$\tilde{z} = \sigma(\log \phi + L). \qquad (5)$$

The total loss (e.g., performance loss and regularization loss) may be differentiable with regard to a number of bits $\phi$, thus enabling stochastic gradient based optimization. In Equation 5, the number of bits $\phi$ represents the number of bits for the entire neural network. The parameter $\phi$ represents the number of bits (e.g., bit-width) during inference. During training, the parameter $\phi$ represents average/expected bit-width selected based on probability distribution.

As described in Equation 1, the second term ($\lambda\|z_i\|_0$) is a per training sample bit-width count/penalty. In some examples, the penalty may be a bitwise L0 regularization loss that penalizes one of a bit-level operation determined, based on the adjusted bit-width and a complexity metric (e.g., a complexity metric associated with the layer), a number of bits allocated to the adjusted bit-width, or a complexity metric. The complexity metric may be based on one or more of the adjusted bit-width, binary operations (BOPS) of the network, a memory footprint (e.g., intermediate activations, compute power, or other complexity metrics. The compute power may be a combination of BOPs, memory bandwidth, and power scaling of hardware associated with the neural network. The regularization loss may be defined as:

$$\|z_i\|_{bic} \triangleq \sum\nolimits_{k}^{K}(q_k - q_{k-1})\prod\nolimits_{j=1}^{k}z_{i,j} \qquad (6)$$

where the parameter $q_k$ represents a complexity metric at a bit-level k, and K represents a maximum bit-width. As an example, if the maximum bit-width K equals eight, a range of the bit-level k may be from one to eight. Each bit-level k results in a custom complexity ($q_k$). For example, using all eight bits ($q_8$) may have higher cost than using four bits ($q_4$). In Equation 6 the metric may be one or more of a bit-width, BOPs, computational complexity, memory footprint, computer power, or another metric at the selected bit-level.

Figure 5:
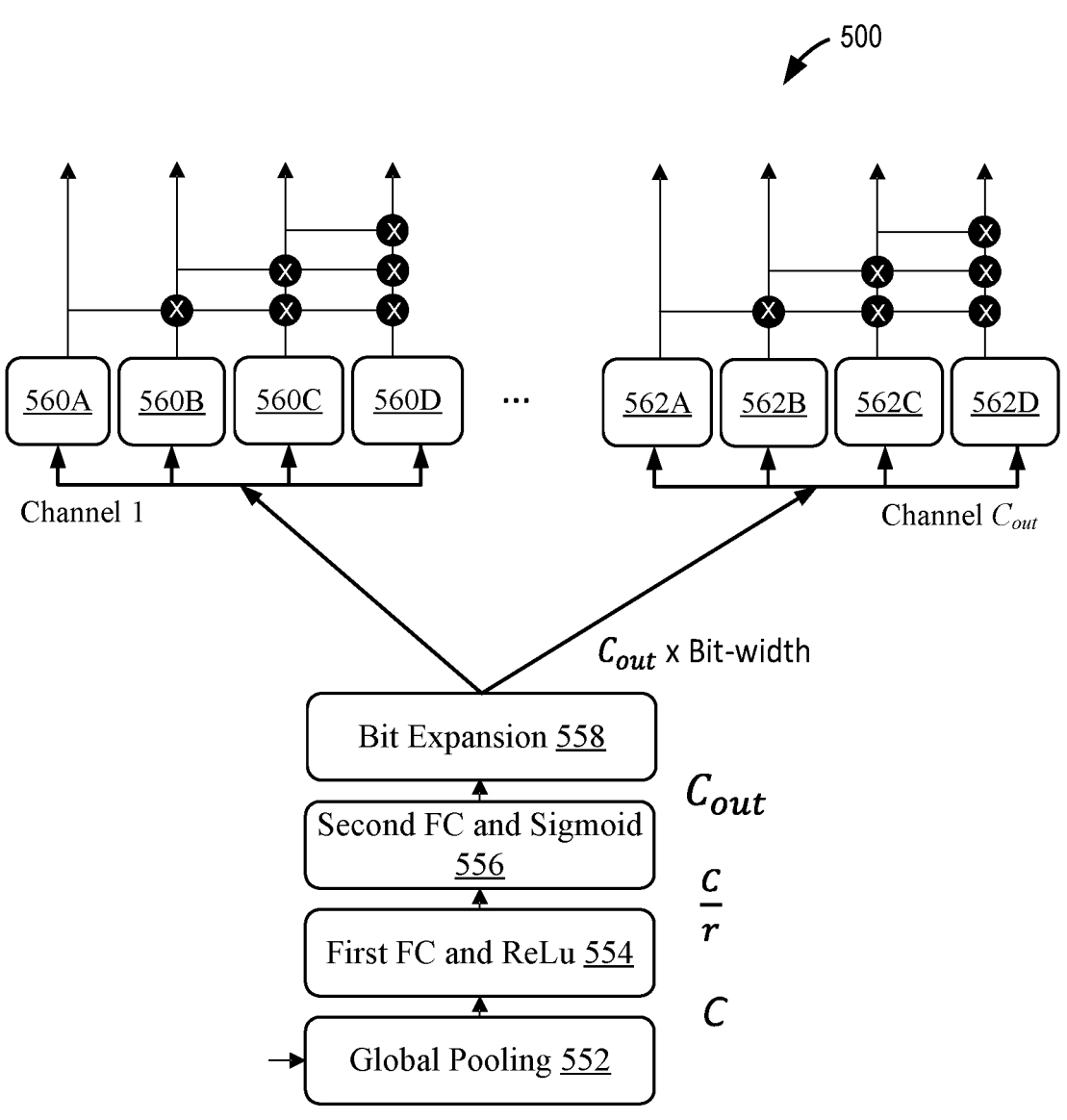
FIG. 5 is a block diagram illustrating an example of a bit-width selector that selects a quantization level for one or more channels of a layer based on an input, in accordance with aspects of the present disclosure.

As described with reference to FIG. 4A, in some aspects, a per-layer quantization level may be selected based on an input. Additionally, or alternatively, a quantization level may be selected for each channel based on the input. FIG. 5 is a block diagram illustrating an example of a bit-width selector 500 that selects a quantization level for one or more channels of a layer based on an input, in accordance with aspects of the present disclosure. In the example of FIG. 5, the bit-width selector 500 may be an example of each of the bit-width selectors 404A, 404B, 404C described in FIG. 4A. As shown in FIG. 5, the bit-width selector 500 includes a global pooling layer 552, a first fully (FC) connected layer 554 that implements a rectified linear unit (ReLu) activation function, a second fully connected layer 556 that implements a sigmoid function, and a bit expansion layer 558. The global pooling layer 552, first fully connected layer 554, second fully connected layer 556 of FIG. 5 perform the same operations as the global pooling layer 452, first fully connected layer 454, and second fully connected layer 456 described with reference to FIG. 4B. For brevity, the operations of the global pooling layer 552, first fully connected layer 554, second fully connected layer 556 will be omitted from the description of FIG. 5. The bit expansion layer 558 may expand the bits based on a product of the bit-width and a number of output channels ($C_{out}$). The bit expansion layer 558 may generate a number of gates for each channel of the number of output channels ($C_{out}$). For example, as shown in the example of FIG. 5, the bit expansion layer 558 generates ($C_{out}$*bit-width) outputs (shown as outputs from Channel 1 to Channel $C_{out}$), where a first set of gates 560A, 560B, 560C, 560D may be associated with a first channel (Channel 1) and a second set of gates 562A, 562B, 562C, 562D may be associated with a last channel ($C_{out}$). In such examples of a channel-wise bit-selection network, bit-widths may be generated for each output layer of the neural network.

FIG. 6 is a flow diagram illustrating an example process 600 performed, for example, by a deep neural network (DNN), in accordance with various aspects of the present disclosure. The example process 600 is an example of dynamically quantizing a parameter of a layer based on an input to a deep neural network.

As shown in FIG. 6, at block 602, the DNN receives, at a layer of the DNN during an inference stage, a layer input comprising content associated with a DNN input received at the DNN. The layer may be an example of one of the layers 402A, 402B, 402C described with reference to FIG. 4A. In block 604, the DNN quantizes one or more parameters of multiple parameters associated with the layer based on the content of the layer input. In some examples, the multiple parameters may be quantized by a bit-width selector, such as the bit-width selector 450 described with reference to FIG. 4B. The multiple parameters may include a set of weights and a set of activations. In some examples, quantizing the one or more parameters comprises generating an adjusted bit-width by adjusting a size of an original bit-width associated with the one or more parameters. The adjusted bit-width may be generated by discarding bits of the original bit-width from least significant bits to most significant bits until the size of the original bit-width equals a size of an adjustment bit-width determined based on the content of the input. In some such examples, the DNN may be trained to determine the size for adjusting the original bit-width based on a total loss, the total loss being a function of a performance loss and a regularization loss. The performance loss may determine a cross-entropy loss or a mean-squared error or other supervised loss functions. Additionally, the regularization loss may be a bitwise L0 regularization loss that penalizes one of the adjusted bit-width and a complexity metric associated with a bit-level operation, or a number of bits allocated to the adjusted bit-width. The complexity metric may include one or more of a number of binary operations of the DNN, a memory footprint of the DNN, or a computer power of the DNN.

In some other examples, quantizing the one or more parameters includes quantizing one or both of the respective set of weights or the respective set of activations of one or more output channels associated with the layer. The respective set of weights and/or the respective set of activations of one or more output channels associated with the layer may be quantized by a bit-width selector, such as the bit-width selector 500 described with reference to FIG. 5. In some examples, a first amount of quantization of a first parameter of the multiple parameters is different than a second amount of quantization of a second parameter of the multiple parameters.

As shown in FIG. 6, at block 606, the DNN performs a task corresponding to the DNN input, the task performed with the one or more one quantized parameters. In some examples, the layer is one layer of multiple layers of the DNN. In such examples, one or more parameters of respective parameters of each layer of the multiple layers may be quantized based on the content of the input. In some such examples, a quantization amount is different for each layer of the multiple layers.

Implementation examples are described in the following numbered clauses.

1. A method performed by a deep neural network (DNN), comprising: receiving, at a layer of the DNN during an inference stage, a layer input comprising content associated with a DNN input received at the DNN; quantizing one or more parameters of a plurality of parameters associated with the layer based on the content of the layer input; and performing a task corresponding to the DNN input, the task performed with the one or more one quantized parameters.

2. The method of Clause 1, in which the plurality of parameter comprise a set of weights and a set of activations.

3. The method of any one of Clause 2, in which quantizing the one or more parameters comprises quantizing one or both of the respective set of weights or the respective set of activations of one or more output channels associated with the layer.

4. The method of any one of Clauses 1-2, in which a first amount of quantization of a first parameter of the plurality of parameters is different than a second amount of quantization of a second parameter of the plurality of parameters.

5. The method of any one of Clauses 1-4, in which quantizing the one or more parameters comprises generating an adjusted bit-width by adjusting a size of an original bit-width associated with the one or more parameters.

6. The method of Clause 5, in which generating the adjusted bit-width comprising discarding bits of the original bit-width from least significant bits to most significant bits until the size of the original bit-width equals a size of an adjustment bit-width determined based on the content of the input.

7. The method of Clause 6, further comprising training the DNN to determine the size for adjusting the original bit-width based on a total loss, the total loss being a function of a performance loss and a regularization loss.

8. The method of Clause 7, in which the performance loss determines a cross-entropy loss or a mean-squared error.

9. The method of Clause 8, in which the regularization loss is a bitwise L0 regularization loss that penalizes one of: the adjusted bit-width and a complexity metric associated with a bit-level operation; or a number of bits allocated to the adjusted bit-width.

10. The method of Clause 9, in which the complexity metric comprises one or more of a number of binary operations of the DNN, a memory footprint of the DNN, or a computer power of the DNN.

11. The method of Clause 9, further comprising: reformulating the bitwise L0 regularization loss as a Bernoulli distribution; relaxing the reformulated bitwise L0 regularization loss based on a sigmoid function; and minimizing the performance loss and the regularization loss based on the number of bits selected for the adjusted bit-width.

12. The method of any one of Clauses 1-11, in which the layer is one layer of a plurality of layers of the DNN, and the method further comprises quantizing one or more parameters of a respective plurality of parameters of each layer of the plurality of layers based on the content of the input.

13. The method of Clause 12, in which a quantization amount is different for each layer of the plurality of layers.

The various operations of methods described above and may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described and in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described and may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described and can be downloaded and/or otherwise obtained by a user terminal and/or base station as applicable. For example, such a device can be coupled to a server to facilitate the transfer of means for performing the methods described. Alternatively, various methods described and can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method performed by a deep neural network (DNN), comprising:
   receiving, at a layer of the DNN during an inference stage, a layer input comprising content associated with a DNN input received at the DNN, each output channel of the layer having an original bit-width prior to receiving the layer input;
   quantizing one or more parameters of a respective plurality of parameters associated with each output channel of one or more output channels of the layer based on the content of the layer input;
   reducing the respective original bit-width for each output channel of the one or more output channels of the layer to generate a respective adjusted bit-width for each output channel of the one or more output channels in accordance with quantizing the one or more parameters, the original bit-width being associated with the one or more parameters, a quantity of bits processed via one or more processors executing the DNN corresponding to a size of the adjusted bit-width, such that one or more of a compute power of the one or more processors or a memory bandwidth of the one or more processors is reduced in accordance with reducing the respective original bit-width for each output channel of the one or more output channels; and
   performing a task corresponding to the DNN input, the task performed via the one or more processors in accordance with the adjusted bit-width.

2. The method of claim 1, in which the respective plurality of parameters comprise a set of weights and a set of activations.

3. The method of claim 2, in which quantizing the one or more parameters comprises quantizing one or both of the respective set of weights or the respective set of activations of each output channel of the one or more output channels associated with the layer.

4. The method of claim 1, in which a first amount of quantization of a first parameter of the respective plurality of parameters is different than a second amount of quantization of a second parameter of the respective plurality of parameters.

5. The method of claim 1, in which generating the adjusted bit-width comprising discarding bits of the original bit-width from least significant bits to most significant bits until a size of the original bit-width equals the size of the adjusted bit-width determined based on the content of the layer input.

6. The method of claim 5, further comprising training the DNN to determine an amount for adjusting the original bit-width based on a total loss, the total loss being a function of a performance loss and a regularization loss.

7. The method of claim 6, in which the performance loss determines a cross-entropy loss or a mean-squared error.

8. The method of claim 7, in which the regularization loss is a bitwise L0 regularization loss that penalizes one of:
   the adjusted bit-width and a complexity metric associated with a bit-level operation; or
   a number of bits allocated to the adjusted bit-width.

9. The method of claim 8, in which the complexity metric comprises one or more of a number of binary operations of the DNN, a memory footprint of the DNN, or a compute power of the DNN.

10. The method of claim 8, further comprising:
   reformulating the bitwise L0 regularization loss as a Bernoulli distribution;
   relaxing the reformulated bitwise L0 regularization loss based on a sigmoid function; and
   minimizing the performance loss and the regularization loss based on the number of bits allocated to the adjusted bit-width.

11. The method of claim 1, in which the layer is one layer of a plurality of layers of the DNN, and
   the method further comprises quantizing one or more parameters of a respective plurality of parameters of each layer of the plurality of layers based on content of a respective layer input.

12. The method of claim 11, in which a quantization amount is different for each layer of the plurality of layers.

13. An apparatus for implementing a deep neural network (DNN), comprising:
   one or more processors;
   one or more memories coupled with the one or more processors; and
   instructions stored in the one or more memories and operable, when executed by the one or more processors, to cause the apparatus to:

receive, at a layer of the DNN during an inference stage, a layer input comprising content associated with a DNN input received at the DNN, each output channel of the layer having an original bit-width prior to receiving the layer input;

quantize one or more parameters of a respective plurality of parameters associated with each output channel of one or more output channels of the layer based on the content of the layer input;

reduce the respective original bit-width for each output channel of the one or more output channels of the layer to generate a respective adjusted bit-width for each output channel of the one or more output channels in accordance with quantizing the one or more parameters, the original bit-width being associated with the one or more parameters, a quantity of bits processed via the one or more processors executing the DNN corresponding to a size of the adjusted bit-width, such that one or more of a compute power of the one or more processors or a memory bandwidth of the one or more processors is reduced in accordance with reducing the respective original bit-width for each output channel of the one or more output channels; and perform a task corresponding to the DNN input, the task performed via the one or more processors in accordance with the adjusted bit-width.

14. The apparatus of claim 13, in which the respective plurality of parameters comprise a set of weights and a set of activations.

15. The apparatus of claim 14, in which the instructions further cause the apparatus to quantize the one or more parameters by quantizing one or both of the respective set of weights or the respective set of activations of each output channel of the one or more output channels associated with the layer.

16. The apparatus of claim 13, in which a first amount of quantization of a first parameter of the respective plurality of parameters is different than a second amount of quantization of a second parameter of the respective plurality of parameters.

17. The apparatus of claim 13, in which the instructions further cause the apparatus to generate the adjusted bit-width by discarding bits of the original bit-width from least significant bits to most significant bits until a size of the original bit-width equals the size of the adjusted bit-width determined based on the content of the layer input.

18. The apparatus of claim 17, in which the instructions further cause the apparatus to determine, during a training stage, an amount for adjusting the original bit-width based on a total loss, the total loss being a function of a performance loss and a regularization loss.

19. The apparatus of claim 18, in which the regularization loss is a bitwise L0 regularization loss that penalizes one of:

the adjusted bit-width and a complexity metric associated with a bit-level operation; or a number of bits allocated to the adjusted bit-width.

20. The apparatus of claim 19, in which the complexity metric comprises one or more of a number of binary operations of the DNN, a memory footprint of the DNN, or a compute power of the DNN.

21. The DNN of claim 19, in which the instructions further cause the DNN to:

reformulate the bitwise L0 regularization loss as a Bernoulli distribution;

relax the reformulated bitwise L0 regularization loss based on a sigmoid function; and minimize the performance loss and the regularization loss based on the number of bits allocated to the adjusted bit-width.

22. The DNN of claim 13, in which the layer is one layer of a plurality of layers of the DNN, and the instructions further cause the DNN to quantize one or more parameters of a respective plurality of parameters of each layer of the plurality of layers based on content of a respective layer input.

23. The DNN of claim 22, in which a quantization amount is different for each layer of the plurality of layers.

24. A non-transitory computer-readable medium having program code recorded thereon for a deep neural network (DNN), the program code executed by one or more processors and comprising:

program code to receive, at a layer of the DNN during an inference stage, a layer input comprising content associated with a DNN input received at the DNN, each output channel of the layer having an original bit-width prior to receiving the layer input;

program code to quantize one or more parameters of a respective plurality of parameters associated with each output channel of one or more output channels of the layer based on the content of the layer input;

program code to reduce the respective original bit-width for each output channel of the one or more output channels of the layer to generate a respective adjusted bit-width for each output channel of the one or more output channels in accordance with quantizing the one or more parameters, the original bit-width being associated with the one or more parameters, a quantity of bits processed via the one or more processors executing the DNN corresponding to a size of the adjusted bit-width, such that one or more of a compute power of the one or more processors or a memory bandwidth of the one or more processors is reduced in accordance with reducing the respective original bit-width for each output channel of the one or more output channels; and program code to perform a task corresponding to the DNN input, the task performed via the one or more processors in accordance with the adjusted bit-width.

25. The non-transitory computer-readable medium of claim 24, in which the respective plurality of parameters comprise a set of weights and a set of activations.

26. The non-transitory computer-readable medium of claim 25, in which the program code to quantize the one or more parameters comprises program code to quantize one or both of the respective set of weights or the respective set of activations of each output channel of the one or more output channels associated with the layer.

27. An apparatus implementing a deep neural network (DNN), comprising:

means for receiving, at a layer of the DNN during an inference stage, a layer input comprising content associated with a DNN input received at the DNN, each output channel of the layer having an original bit-width prior to receiving the layer input;

means for quantizing one or more parameters of a respective plurality of parameters associated with each output channel of one or more output channels of the layer based on the content of the layer input;

means for reducing the respective original bit-width for each output channel of the one or more output channels of the layer to generate a respective adjusted bit-width for each output channel of the one or more output channels in accordance with quantizing the one or more parameters, the original bit-width being associated with the one or more parameters, a quantity of bits processed via one or more processors executing the DNN corresponding to a size of the adjusted bit-width, such that one or more of a compute power of the one or more processors or a memory bandwidth of the one or more processors is reduced in accordance with reducing the respective original bit-width for each output channel of the one or more output channels; and means for performing a task corresponding to the DNN input, the task performed via the one or more processors in accordance with the adjusted bit-width.

28. The apparatus of claim 27, in which the means for quantizing the one or more parameters comprises means for quantizing one or both of the respective set of weights or the respective set of activations of each output channel of the one or more output channels associated with the layer.

\* \* \* \* \*